United States Patent [19]
Nagao

[11] Patent Number: 5,887,354
[45] Date of Patent: Mar. 30, 1999

[54] ELECTRONIC LEVEL AND LEVELING ROD FOR USE IN ELECTRONIC LEVEL

[75] Inventor: Takashi Nagao, Atsugi, Japan

[73] Assignee: Sokkia Co., Ltd., Tokyo, Japan

[21] Appl. No.: 838,780

[22] Filed: Apr. 10, 1997

[30]  Foreign Application Priority Data

Jul. 24, 1996 [JP] Japan .................................... 8-194321

[51] Int. Cl.$^6$ .............................. G01C 15/06; G01C 3/02
[52] U.S. Cl. ................................................ 33/293; 33/707
[58] Field of Search ............................ 33/293, 294, 295, 33/296, 706, 707; 356/373, 375, 383

[56]  References Cited

U.S. PATENT DOCUMENTS

| | | | |
|---|---|---|---|
| 940,007 | 11/1909 | Granbery ................................... | 33/293 |
| 952,275 | 3/1910 | De La Peña ............................... | 33/296 |
| 3,110,109 | 11/1963 | Brittenham et al. ...................... | 33/293 |
| 3,973,327 | 8/1976 | Cardinale .................................. | 33/293 |
| 4,403,859 | 9/1983 | Ernst ......................................... | 33/707 |
| 4,572,952 | 2/1986 | March ...................................... | 356/375 |
| 4,693,598 | 9/1987 | Sehr ......................................... | 33/293 |
| 4,715,714 | 12/1987 | Gaechter et al. ......................... | 356/375 |
| 4,948,986 | 8/1990 | Matsui ...................................... | 356/375 |
| 5,313,409 | 5/1994 | Wiklund et al. .......................... | 33/293 |
| 5,402,223 | 3/1995 | Schlobohm et al. ...................... | 33/293 |
| 5,539,993 | 7/1996 | Kilpinen et al. .......................... | 33/707 |

FOREIGN PATENT DOCUMENTS

| | | |
|---|---|---|
| 5-18042 | 3/1993 | Japan . |
| 7-4959 | 1/1995 | Japan . |
| 257059 | 8/1926 | United Kingdom ..................... 33/293 |

*Primary Examiner*—G. Bradley Bennett
*Attorney, Agent, or Firm*—Nikaido, Marmelstein, Murray & Oram LLP

[57]  ABSTRACT

In automatically obtaining a height h of a collimated position by collimating a leveling rod 1 to which bar marks 11 are attached, if the height h is obtained by an image pattern of the leveling rod 1, the size of the image pattern of the leveling rod 1 must be corrected inside an electronic level 2 depending on the distance between the leveling rod 1 and the electronic level 2. A long time is required for the computation processing for this correction. In this invention, on the other hand, the ratios of the distances between respectively adjoining bar marks 11 are obtained and the height h is obtained from the manner in which the ratios are arrayed.

5 Claims, 6 Drawing Sheets

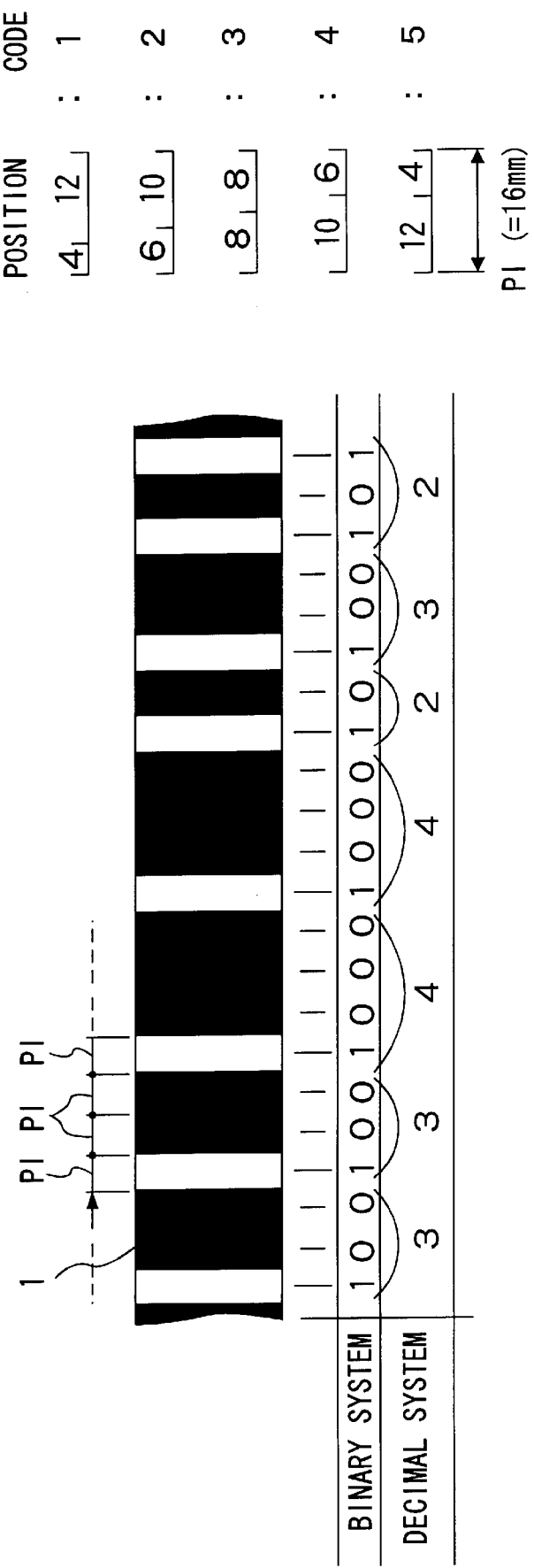

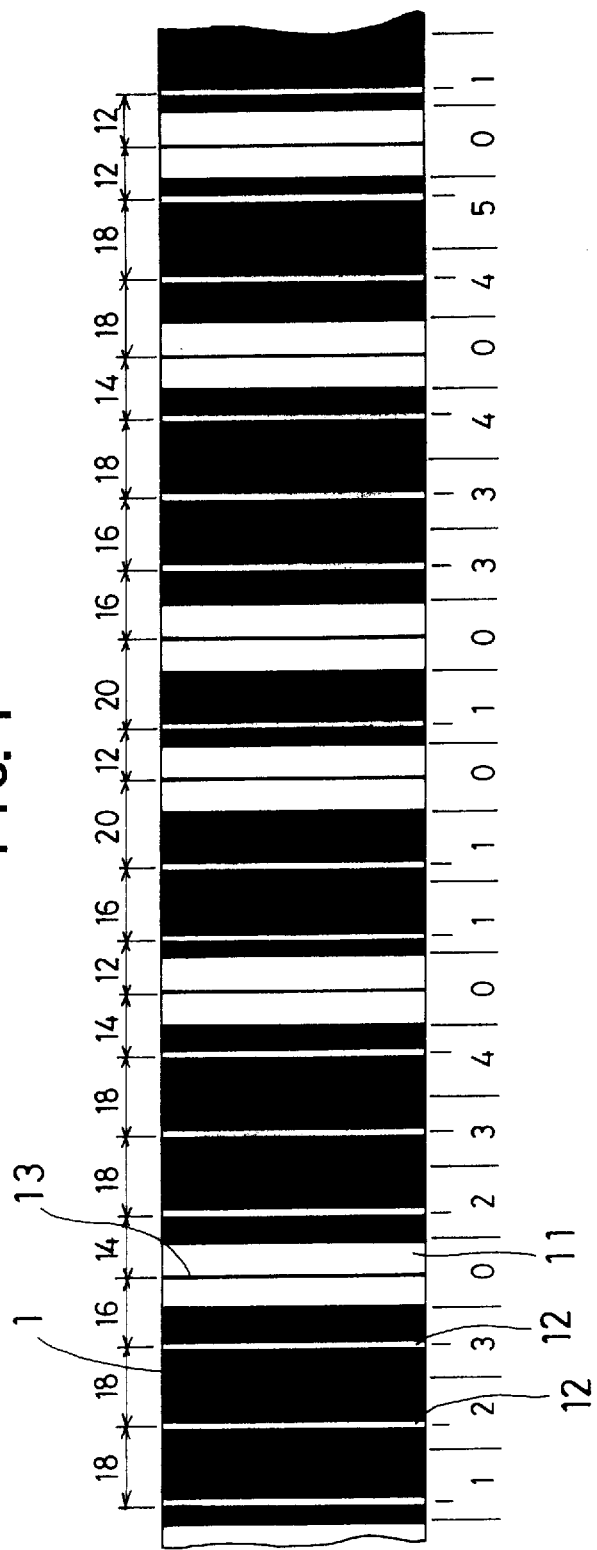

ELECTRONIC LEVEL AND LEVELING ROD FOR USE IN ELECTRONIC LEVEL

BACKGROUND OF THE INVENTION

1. Field of the Invention

The present invention relates to an electronic level to automatically obtain a height and to a leveling rod (or a staff) which is used together with the electronic level.

2. Description of the Related Art

As this kind of electronic level and a leveling rod, there is known, for example, in Japanese Published Examined Patent Application No. 18042/1993 or Japanese Published Unexamined Patent Application No. 4959/1995, a leveling rod for use with an electronic level having a plurality of bar marks (i.e., marks in the shape of bars) which are provided in a longitudinal direction of the leveling rod. In this leveling rod, bar marks whose pitches between respectively adjoining bar marks are appropriately varied with one another are collimated by the electronic level. Then a wave form which is obtained from an array pattern of the bar marks in the collimated position is compared inside the electronic level with a wave form that is stored in advance in the electronic level. From a position in which the wave forms coincide with each other, the height of the collimated position is obtained.

The wave form to be obtained from the array pattern of the bar marks that are attached to the leveling rod varies in its size with the distance between the leveling rod and the electronic level, or with the magnification of the electronic level. In the above-described conventional electronic level and the leveling rod, the collimated position is obtained by coinciding the wave form to be obtained from the array pattern of the bar marks with the wave form that is stored in advance in the electronic level. It follows that, before comparing the wave forms with each other, they must be corrected to a predetermined size. However, in order to perform this kind of correction, the distance between the leveling rod and the electronic level must be obtained, resulting in a disadvantage in that a long time is required to make computation for the correction.

The present invention has an object of eliminating the above-described disadvantage.

SUMMARY OF THE INVENTION

In order to attain the above and other objects, according to a first aspect of the present invention, there is provided a leveling rod for an electronic level, the leveling rod having a plurality of first set of bar marks disposed in a longitudinal direction thereof in parallel with each other. The leveling rod is characterized in: that width dimensions in the longitudinal direction of the plurality of bar marks are identical with each other; that ratios of pitches of respectively adjoining bar marks are represented by a plurality of integers; and that a permutation of values continuously chosen in a predetermined number from a sequence of numbers of the ratios of respective pitches is different from any permutation chosen from any position of the sequence of numbers.

The pitches may be integer multiples of the width dimension of the bar marks and the integer is 2 or more. A second set of bar marks for a subsidiary leveling rod may be provided together with the first set of bar marks such that each of the second set of bar marks has an appropriate width dimension which is smaller than the width of each of the first set of bar marks.

According to a second aspect of the present invention, there is provided an electronic level for measuring by collimating that leveling rod for the electronic level which is described in the first aspect of the present invention. The electronic level comprises: a pattern detecting portion for detecting an array pattern of the bar marks on the leveling rod; a memory portion for storing therein the sequence of numbers in advance; and a computation portion for obtaining, based on a detected signal from the pattern detecting portion, with which part of a sequence of numbers in the memory portion a permutation of ratios of pitches of respectively adjoining bar marks coincides, to thereby obtain a collimated position from the part of the coincidence.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 5 is a diagram showing another embodiment of the leveling rod;

FIG. 6 is a diagram explaining the codes of a subsidiary leveling rod; and

FIG. 7 is a diagram showing a leveling rod to which bar marks for the subsidiary leveling rod are added.

DETAILED DESCRIPTION OF A PREFERRED EMBODIMENT

Figure 1:
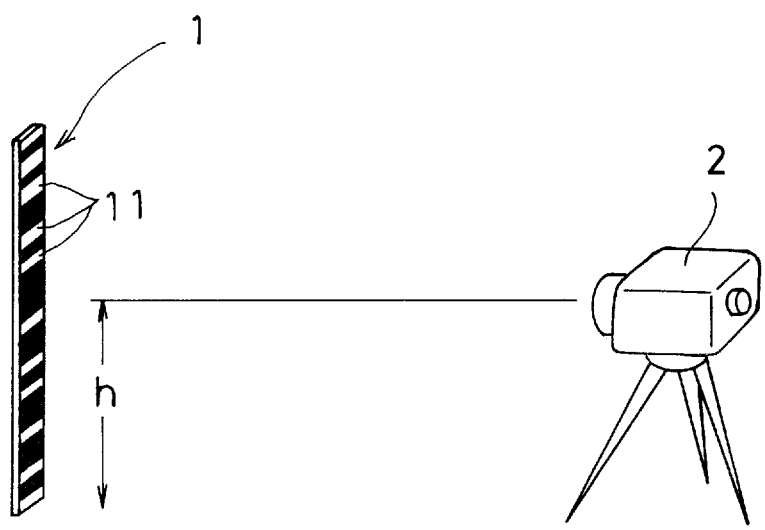
FIG. 1 shows a condition of use of a leveling rod according to the present invention.
Figure 2:
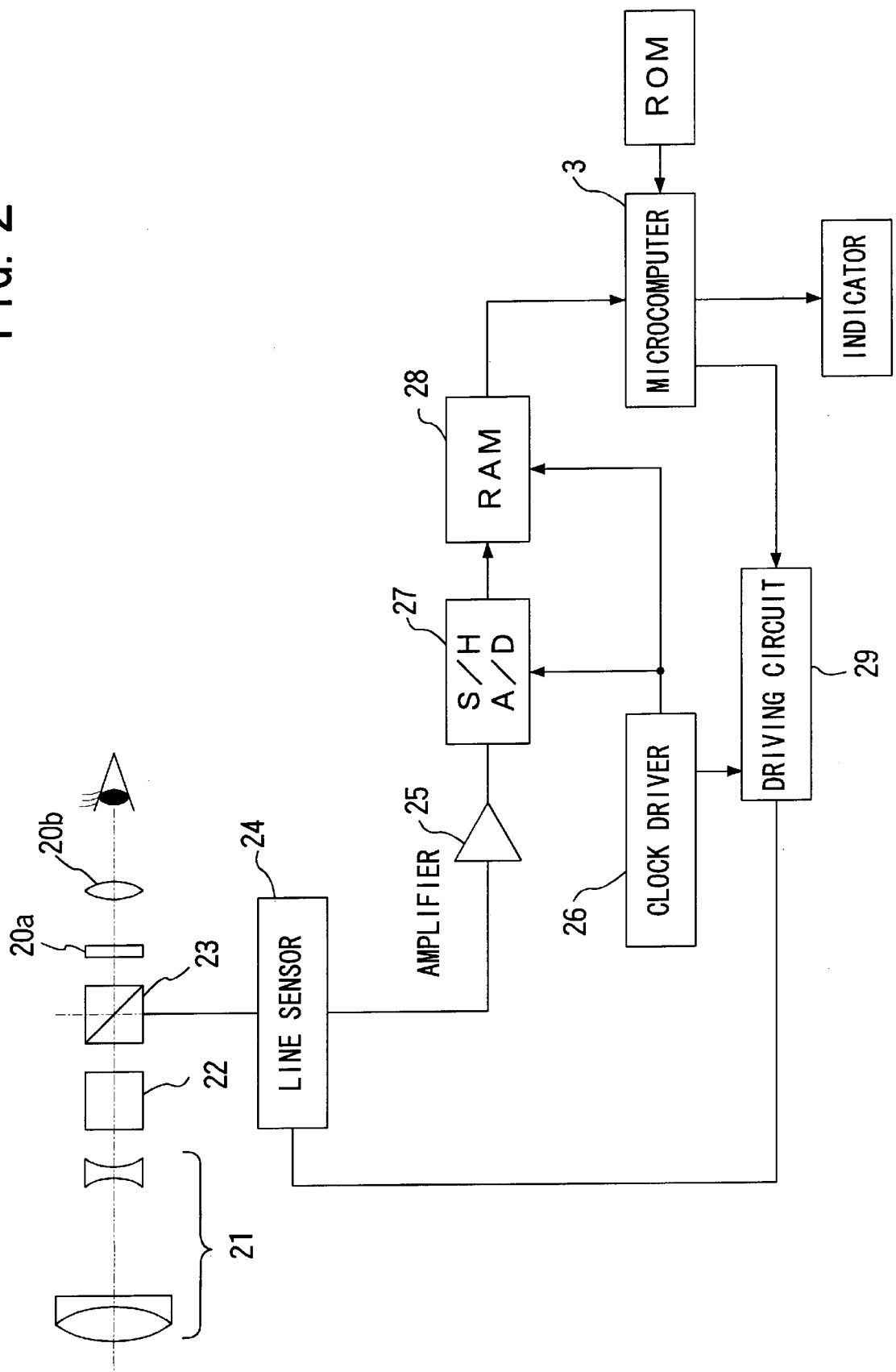
FIG. 2 is a block diagram showing an interior mechanism of an electronic level.
Figure 3:
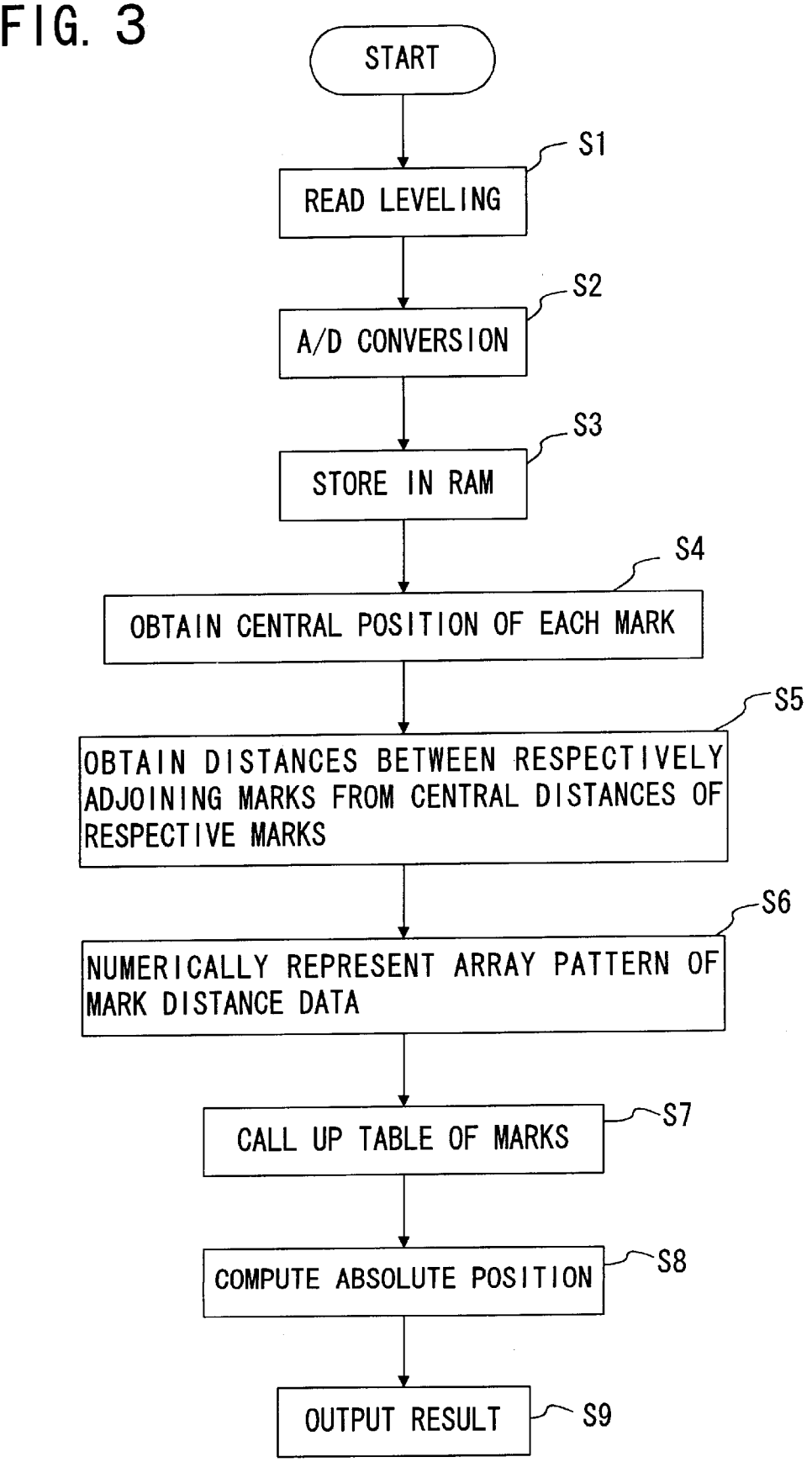
FIG. 3 is a flow diagram showing the contents of computing processes inside the electronic level.

With reference to FIG. 1, reference numeral 1 denotes a leveling rod or a staff. It is collimated by an electronic level 2 to thereby measure the height h of the collimated position. The leveling rod is marked on its black base surface with a plurality of bar marks 11 (white in color) at pitches to be described hereinbelow. With reference to FIGS. 2 and 3, the electronic level 2 is provided inside thereof with an optical system 21 and a mechanism for automatically compensating an inclination (compensator) 22. An optically received image of the leveling rod 1 is split by a beam splitter 23 into a line sensor 24. The image to pass through the beam splitter 23 constitutes a collimation optical system, and the image split into the line sensor 24 constitutes an image optical system. The collimation optical system is made up of the above-described optical system 21, the automatic inclination compensating mechanism 22, the beam splitter 23, a focus plate 20a, and an eyepiece 20b. The image optical system is made up of the optical system 21, the automatic inclination compensating mechanism 22, the beam splitter 23, and the line sensor 24. The line sensor 24 converts the optically received image of the leveling rod 1 into an electric signal and outputs it to an amplifier 25 (S1). The signal amplified by the amplifier 25 is sent to a sampling and holding means (S/H) in a manner synchronized with a clock signal of a clock driver 26. The signal held in the sampling and holding means is converted to a digital signal (A/D) (S2). The signal that has been converted to the digital signal is stored in a RAM (random access memory) 28 (S3). A microcomputer 3 obtains the position of the image of each mark 11 on the basis of a signal stored in the RAM 28 (S4), and the distances between respectively adjoining bar marks 11 are obtained from the central distances of the respective bar marks 11 (S5). A driving circuit 29 is a circuit to control the operation of the line sensor 24. Since the optical axis of the collimation optical system and the optical axis of the image optical system are arranged to coincide with each other, the collimated point on the leveling rod 1 and the collimated point in the image optical system coincide with each other.

The contents of the above-described steps S4 and S5 will now be explained in more detail with reference to FIG. 4. The leveling rod 1 is provided on its black base surface with white bar marks 11 as described hereinbefore. The width dimension of each of the bar marks 11 is all unified into the same dimension D. The distance between each set of adjoining bar marks 11 is set so as to be an integer multiple of a unit dimension PI. A permutation in which N pieces of integers are continuously chosen from a sequence of numbers consisting of M kinds of integers will be available in kinds that correspond to the Nth power of M. In this embodiment, the distances between the respectively adjoining marks 11 are selected to be three kinds of integer multiples (plurality of integers) consisting of two times (2PI), three times (3PI), and four times (4PI) of the PI. The distances between the respectively adjoining bar marks 11 are set such that a permutation of the values continuously chosen, for example in three in number from the sequence of numbers consisting of these three kinds of integers varies with a permutation chosen from any position of the sequence of numbers. In other words, in the leveling rod 1 shown in FIG. 4, the sequence of numbers of the distance ratios of the bar marks 11 is represented as $$\ldots 3, 4, 2, 4, 2, 3, 3, 3, 4, 3, 3, 2, 2 \ldots \quad (1)$$

Figure 4:
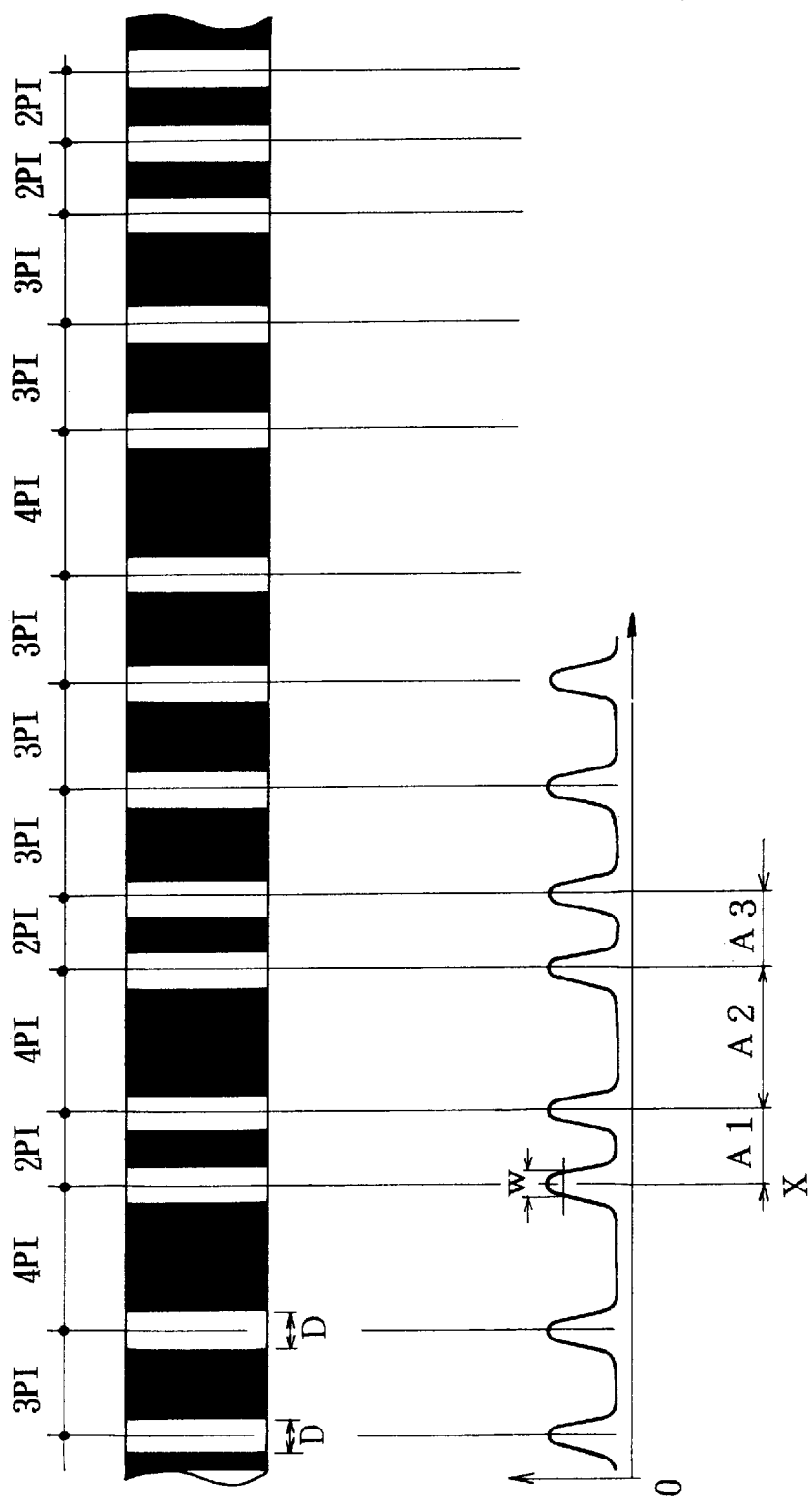
FIG. 4 is a diagram to explain the constitution of the leveling rod and the image signal.

Among the output signals of the line sensor 24 shown in the lower portion of FIG. 4, the position X that corresponds to the bar mark in the collimated position is obtained, and further the peak distances A1, A2, and A3 of the signals are continuously obtained from X. Then, as shown in step S6 in FIG. 3, the peak distances A1, A2, and A3 are numerically represented. The ratios of A1, A2 and A3 become 1:2:1, but on the basis of W which corresponds to the width dimension of the bar mark 11, the permutation [2, 4, 2] which corresponds to the distances of the bar marks can be obtained. On the other hand, a ROM (read-only memory) has stored therein, in the form of a table, a sequence of numbers of the ratios of the distances between respectively adjoining bar marks on the leveling rod 1 (same as the above-described sequence of numbers (1)). By calling up the table (S7), it is obtained with which position of the table the permutation [2, 4, 2] coincides. An absolute position of the above-described X is computed from the coinciding position (S8). The result thereof is then indicated in an indicator (S9).

The ratios of the distances of the bar marks 11 are employed as they are in the above-described embodiment. On the other hand, the following arrangement may also be employed. Namely, the width dimension D of each bar mark 11 is made to coincide with P1 and, as shown FIG. 5, the leveling rod 1 is partitioned or divided by a unit of P1. The white bar mark portions are defined to be 1 and the black base surface portion is defined to be 0. Then, the bar mark distances can be represented in a binary system. To represent them in the binary system is to convert them into binaries (i.e., two figures). It follows that the computation processing of the permutation of continuously chosen three distances as well as of the table in the microcomputer 3 becomes easy.

The above-described leveling rod 1 and the electronic level 2 are relatively set apart from each other. There will be no problem in case where the images of a relatively large number of bar marks 11 can be contained in the line sensor 24. But in case where the distance between the two becomes too close to secure in the line sensor 24 the required number of bar marks 11, the measurement can no longer be performed. Therefore, an arrangement is made as shown in FIG. 6. Namely, the codes of 1 through 5 are set in advance such that an interior division of 4:12 is defined to be 1 and so on until an interior division of 12:4 is defined to be 5, provided P1 is 16 mm. On the other hand, as shown in FIG. 7, the leveling rod 1 is partitioned or divided by a unit of PI in the same manner as in FIG. 5. The black base surface divided by P1 is adhered with white elongated bar marks 12 which are intended for a subsidiary leveling rod. The white bar marks 12 are added to the positions which correspond to the codes shown in the above-described FIG. 6. Further, in the center of the white bar marks 11, black bar marks 13 are attached so that the code 0 can be represented at the portion of each of the white bar marks 11. In other words, a sequence of numbers can be formed for the subsidiary leveling rod by using six kinds of codes consisting of codes 1 through code 5 as shown in FIG. 6 as well as a code 0. If three numbers are continuously chosen from this sequence of numbers in the same manner as in the above embodiment to thereby obtain an absolute position of the collimated position, the collimated position can be represented in 205 kinds of permutations which are obtained, after subtracting 11 kinds of permutations in which code 0 is continuously plotted, out of 216 kinds of permutations which correspond to the third power of 6. The bar marks 12, 13 on the subsidiary leveling rod or the like are set to be smaller in width than that of the bar marks 11. Therefore, in case where the leveling rod 1 and the electronic level 2 are distant from each other, the bar marks 12, 13 will not be recognized by the line sensor 24. It follows that the bar marks 12, 13 will not be a hindrance to the embodiments shown in FIG. 4 or FIG. 5.

As can be seen from the above explanations, since the absolute position of the collimated position is obtained by the ratios of the distances between the respectively adjoining bar marks attached to the leveling rod, it is not subject to the influence of the magnification of the electronic level and of the distance between the leveling rod and the electronic level. Therefore, there is no need of correction depending on the distance between the leveling rod and the electronic level.

It is readily apparent that the above-described leveling rod for an electronic level as well as an electronic level meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A leveling rod for an electronic level, said leveling rod having a first set of bar marks as a plurality of bar marks disposed adjacent each other in a longitudinal direction along the leveling rod and in parallel with each other and perpendicular to a length of the rod, wherein:

width dimensions of said bar marks in said longitudinal direction of the leveling rod are identical with each other;

ratios of pitches of respectively adjoining bar marks are represented by a plurality of integers; and wherein a permutation of values continuously chosen in a predetermined number from a sequence of numbers of said ratios of respective pitches of said first set of bar marks is different from any permutation chosen from any position of said sequence of numbers.

2. A leveling rod for an electronic level according to claim 1, wherein said pitches are integer multiples of the width dimension of said bar marks and wherein said integer is 2 or more.

3. A leveling rod for an electronic level according to claim 1, wherein a second set of bar marks for a subsidiary leveling rod are provided together with said first set of bar marks, each of said second set of bar marks having an appropriate width dimension which is smaller than the width of each of said first set of bar marks.

4. A leveling rod for an electronic level according to claim 2, wherein a second set of bar marks for a subsidiary leveling rod are provided together with said first set of bar marks, each of said second set of bar marks having an appropriate width dimension which is smaller than the width of each of said first set of bar marks.

5. An electronic level for measuring by collimating a leveling rod for an electronic level as described in any one of claims 1 through 4, said electronic level comprising:

a pattern detecting portion for detecting an array pattern of said bar marks on the leveling rod;

a memory portion for storing therein said sequence of numbers in advance; and a computation portion for obtaining, based on a detected signal from said pattern detecting portion, with which part of a sequence of numbers in said memory portion a permutation of ratios of pitches of respectively adjoining bar marks coincides, to thereby obtain a collimated position from the part of the coincidence.

* * * * *